Patented Jan. 16, 1940

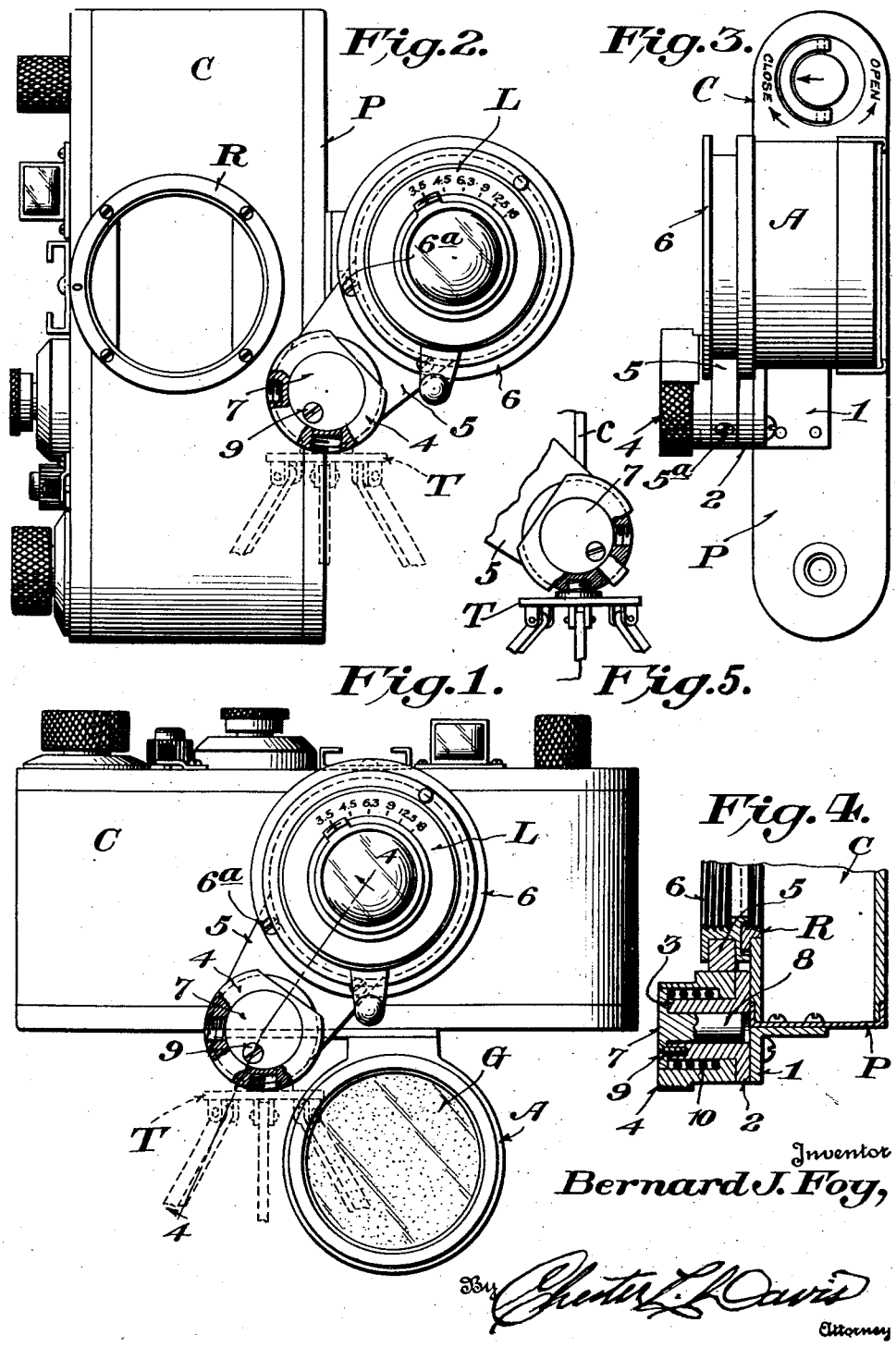

2,187,709

UNITED STATES PATENT OFFICE 2,187,709

PHOTOGRAPHIC APPARATUS

Bernard J. Foy, Washington, D. C., assignor of one-half to Leon H. Troshinsky, Washington, D. C.

Application December 31, 1937, Serial No. 182,904

6 Claims. (Cl. 95—44)

My invention relates to photographic apparatus and more particularly to an appliance for cameras to facilitate easy manipulation.

An object of my invention is to provide a camera having an improved visual focusing device associated therewith.

It is a further object of my invention that the improved camera employ what is ordinarily known as a ground glass focusing panel capable of being rapidly substituted for the camera proper.

It is a still further object of my invention to provide an improved camera especially suitable for copy work.

A more general idea of my invention may be obtained by referring to the following specification and to the accompanying drawing, wherein:

Fig. 1 shows a front elevation of my improved camera with the lens in position for taking a picture; Fig. 2 shows another front elevation with the lens in the position for focusing; Fig. 3 is a bottom view of the camera showing the base plate of the camera proper, Fig. 4 shows a sectional view of the pivot assembly which supports the focusing mechanism, and Fig. 5 is a detail view of a preferred form of mounting.

The camera illustrated is that which is ordinarily known as a Leica, and while it is understood that the invention is capable of being used with any type of camera, the arrangement as illustrated is applied only to this camera.

Where it is desired to use a camera having a ground glass focusing panel, it is not infrequent that considerable time is lost in substituting the sensitized film for the focusing panel and on many occasions one loses the opportunity to get the photograph desired just because of such delay. Of course there are cameras of the reflux type and of the twin-lens type but each of them has certain practical and inherent disadvantages. In cameras such as the improved models of the Leica and Contax types, what is known as a coupled range finder is incorporated in their design. The main disadvantage of this range finder is that of parallax, difficulty in using under poor light and improper or inaccurate field of view. In using a camera of my improved design the above disadvantages are not experienced.

The camera body C has a lens opening surrounded by a lens flange R. The flange R is not flush with the camera but extends out as on the usual models of cameras of the type illustrated. This form a light trap with the collar 6 shown in Fig. 3 so that when the collar 6 is in place for taking the picture the only light reaching the sensitive film will be through the lens L (Fig. 1 or 2). The base plate P of the camera carries a bracket 1 which in turn supports the focusing panel A which has a ground glass viewing surface G. The lens carrier assembly is also supported by bracket 1 and consists of an arm 5 which is associated with the bracket by means of a pivot and shaft assembly 2, 7, 8 and 9 carrying a milled knob 4 at the pivot and carrying the lens collar 6 made fast to it at the other end by some such means as the screws 6a. The pivot assembly is more clearly shown in Fig. 4. It will be seen that the spring 10 is retained in the recessed portion of knob 4 by means of a plate 7 secured to the shaft portion 2 by means of screw 9. The knob 4 can be integral with or carried by the arm 5 and retained thereto by means of screws 5a. The purpose of the spring assembly is to cause the arm 5 and consequently the collar 6 as shown in Fig. 3, to come up flush with the body C or the ring R always in the same manner in order to insure accuracy of spacing and accordingly correct focus.

The mode of operation of the arrangement will be clear from a comparison of Figs. 1 and 2. A bushing formed in the knob 4 is shown in these figures connected to a tripod stud to show how the camera may be mounted in practice. While the arrangement shown in Figs. 1 and 2 is for taking the picture horizontally it is obvious that the other bushing, formed at right angles to the first one, would be engaged with the tripod stud, as shown in Fig. 5, in order to take pictures vertically. With the lens L in the position shown in Fig. 1, the camera is ready for operation, that is, for making the exposure.

When it is desired to focus it is only necessary to move the camera through an angle of 90 degrees so that it assumes the position shown in Fig. 2. While in this position the focusing mount of the lens is adjusted so that the image is properly centered on the ground glass and is in accurate focus. The distance from the front of the lens carrying collar 6 to the ground glass G of focusing panel A is necessarily the same as the distance from the front of the lens carrying collar 6 to the plane of the film in the camera. The important feature of operation to keep in mind is that the camera is moved to position behind the lens or the focusing panel is moved to position behind the lens. By keeping the lens stationary it is obvious that there will be no parallax.

There are many advantages of the improved camera of my invention. It is exceedingly portable and light in weight. It can be manufactured as permanently attached to the base plate of a camera such as the Leica, and an auxiliary base plate without the attachment could be available when it is desired to use the camera in the usual manner without employing my improvement. Objectives of any focal length may be employed and may readily be interchanged, in each case the correct field of view and focus being obtained. The arrangement is especially suitable for copying use where ordinarily, although not necessarily, extension tubes are employed between the lens L and lens collar 6. Where the usual Leica lens is employed on the arrangement illustrated it is a very simple task to compensate for change in normal focus due to the thickness of collar 6. This is accomplished by employing a spacing band between the flange of the lens and the diaphragm ring. Although not illustrated, it would be easy to employ a plate or cap likewise carried by an arm integral with arm 5 but at right angles with respect thereto, in order that the shutter assembly might be protected from dust during the focusing operation. It is further understood that the arrangement may be constructed on a plate which could be secured to a tripod and which in turn could carry a tripod screw to hold the camera proper, or the plate could be adapted to clamp on the camera.

It is apparent that many other modifications and adaptations can be made without departing from the scope of my invention as expressed in the following claims.

I claim:

1. In combination, a camera device adapted to be mounted on a tripod or the like and having a casing provided with a lens opening, a focusing panel rigidly mounted on the casing and having an axis parallel to that of the lens opening, a lens holder arm having at one end a lens, interlocking, light-trapping shoulders complementally formed on the lens holder arm about the lens and on the camera casing about the periphery of the lens opening, pivot elements formed on the camera casing and directly on the other end of the lens holder arm respectively and connected together for pivotal movement about an axis parallel to and equidistant from the first named axes and for relative axial movement whereby the shoulders may be separated axially and the camera casing rotated about the pivot axis to bring the focusing panel and lens opening selectively into alignment with the lens, and means formed directly on the lens holder arm pivot element adapted to be connected to a tripod or the like to mount the lens holder arm fast thereon with the axis of the lens substantially horizontal.

2. In combination, a camera device adapted to be mounted on a tripod or the like and having a casing provided with a lens opening, a focusing panel rigidly mounted on the casing and having an axis parallel to that of the lens opening, a lens holder arm having at one end a lens, interlocking, light-trapping shoulders complementally formed on the lens holder arm about the lens and on the camera casing about the periphery of the lens opening, pivot elements formed on the camera casing and directly on the other end of the lens holder arm respectively and connected together for pivotal movement about an axis parallel to and equidistant from the first named axes and for relative axial movement whereby the shoulders may be separated axially and the camera casing rotated about the pivot axis to bring the focusing panel and lens opening selectively into alignment with the lens, means formed directly on the lens holder arm pivot element adapted to be connected to a tripod or the like to mount the lens holder arm fast thereon with the axis of the lens substantially horizontal, and spring means interposed between portions of the pivot elements yieldably resisting axial separation of the shoulders.

3. In combination, a camera device adapted to be mounted on a tripod or the like and having a casing provided with a lens opening, a focusing panel rigidly mounted on the casing and having an axis parallel to that of the lens opening, a lens holder arm having at one end a lens, an inner post rigid with the camera casing and having an axis parallel to and equidistant from the first named axes, an outer sleeve formed on the other end of the lens holder arm and embracing the post for pivotal movement about the post axis whereby the camera casing may be rotated about the post axis to bring the focusing panel and lens opening selectively into alignment with the lens, and a threaded radial opening in the sleeve adapted to be engaged by the screw of a tripod or the like for mounting the lens holder arm fast thereon with the axis of the lens substantially horizontal.

4. In combination, a camera device adapted to be mounted on a tripod or the like and having a casing provided with a lens opening, a focusing panel rigidly mounted on the casing and having an axis parallel to that of the lens opening, a lens holder arm having at one end a lens, interlocking, light-trapping shoulders complementally formed on the lens holder arm about the lens and on the camera casing about the periphery of the lens opening, an inner post formed rigid with the camera casing and having an axis parallel to and equidistant from the first named axes, an outer sleeve formed on the other end of the lens holder arm and embracing the post for pivotal movement about the post axis, said post and sleeve being connected together for relative axial movement whereby the shoulders may be separated axially and the camera casing rotated about the post axis to bring the focusing panel and lens opening selectively into alignment with the lens, and a threaded radial opening in the sleeve adapted to be engaged by the screw of a tripod or the like for mounting the lens holder arm fast thereon with the axis of lens substantially horizontal.

5. In combination, a camera device adapted to be mounted on a tripod or the like and having a casing provided with a lens opening, a focusing panel rigidly mounted on the casing and having an axis parallel to that of the lens opening, a lens holder arm having at one end a lens, interlocking, light-trapping shoulders complementally formed on the lens holder arm about the lens and on the camera casing about the periphery of the lens opening, pivot elements formed on the camera casing and directly on the other end of the lens holder arm respectively and connected together for pivotal movement about an axis parallel to and equidistant from the first named axes and for relative axial movement whereby the shoulders may be separated axially and the camera casing rotated about the pivot axis to bring the focusing panel and lens opening selectively into alignment with the lens, and means formed directly on the lens holder arm for mounting the lens holder arm to extend obliquely upwardly from a tripod or the like whereby the camera may be rotated substantially 90° about said pivot axis between vertical and horizontal positions.

6. In combination, a camera device adapted to be mounted on a tripod or the like and having a casing provided with a lens opening, a focusing panel rigidly mounted on the casing and having an axis parallel to that of the lens opening, a lens holder arm having at one end a lens, interlocking, light-trapping shoulders complementally formed on the lens holder arm about the lens and on the camera casing about the periphery of the lens opening, pivot elements formed on the camera casing and directly on the other end of the lens holder arm respectively and connected together for pivotal movement about an axis parallel to and equidistant from the first named axes and for relative movement whereby the shoulders may be separated axially and the camera casing rotated about the pivot axis to bring the focusing panel and lens opening selectively into alignment with the lens, and means formed on the lens holder arm for mounting the lens holder arm to extend obliquely upwardly from a tripod or other support selectively to the right or left hand side of the vertical axis of said support, whereby when the lens holder arm extends to one of said sides the camera casing and focusing panel may be rotated substantially 90° about said pivot axis to bring the camera casing into horizontal position with the lens opening in alignment with the lens and whereby when the lens holder arm extends to the other of said sides the camera casing and focusing panel may be rotated substantially 90° about said pivot axis to bring the camera casing into vertical position with the lens opening in alignment with the lens.

BERNARD J. FOY.